C. G. FETTE.
AUTOMOBILE GEAR LOCK.
APPLICATION FILED DEC. 1, 1919.
1,363,766.
Patented Dec. 28, 1920.
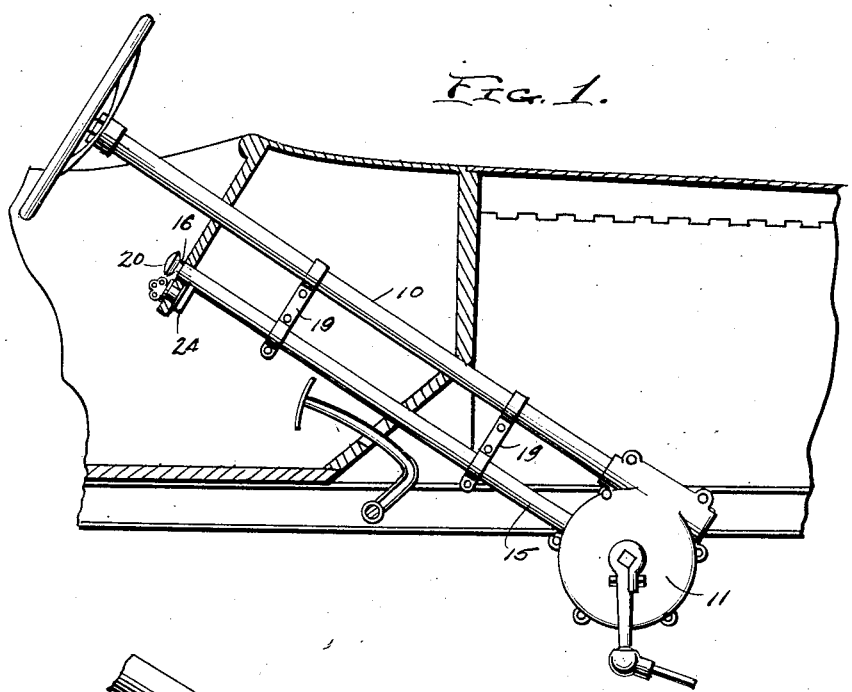
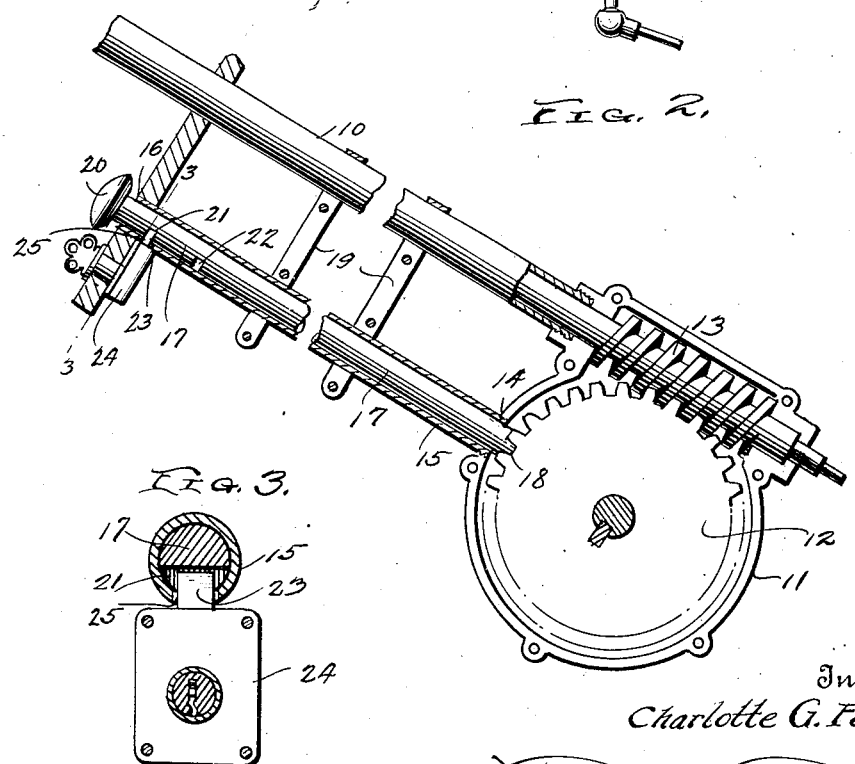
Inventor
Charlotte G. Fette

UNITED STATES PATENT OFFICE.

CHARLOTTE G. FETTE, OF SHELTON, CONNECTICUT.

AUTOMOBILE-GEAR LOCK.

1,363,766.	Specification of Letters Patent.	Patented Dec. 28, 1920.

Application filed December 1, 1919. Serial No. 341,625.

*To all whom it may concern:*

Be it known that I, CHARLOTTE G. FETTE, a citizen of the United States, residing at Shelton, in the county of Fairfield, State of Connecticut, have invented certain new and useful Improvements in Automobile-Gear Locks; and I do hereby declare the following to be a full, clear, and exact description of the invention, such as will enable others skilled in the art to which it appertains to make and use the same.

This invention relates to new and useful improvements in locks and particularly to locks for automobiles.

One object of the present invention is to provide a novel and improved device of this character by means of which the steering post can be effectively locked against rotation, thus preventing steering of the automobile should an attempt be made to steal the same.

Another object is to provide a novel and improved device of this character which is readily capable of attachment to automobiles now in use without modifications of a radical character.

Other objects and advantages will be apparent from the following description when taken in connection with the accompanying drawing.

In the drawing:

Figure 1 is a vertical longitudinal sectional view through a portion of an automobile showing the steering column and gear with the lock in position thereon.

Fig. 2 is a vertical longitudinal sectional view through the locking device.

Fig. 3 is a transverse sectional view taken on the line 3—3 of Fig. 2.

Referring particularly to the accompanying drawing, 10 represents the steering column, 11 the gear casing at the lower end of the column, in which is disposed the worm gear 12 which is engaged by the worm 13 on the steering post or rod of the steering column. In the gear case there is formed an opening 14, and secured to the case, and covering this opening, is the lower end of a metal tube 15. The upper end of this tube is secured to the front face of the dashboard and covers an opening 16, formed in the dashboard. Disposed for longitudinal slidable movement in this tube is a rod 17, the lower end of which is tapered, as at 18, and passes through the opening in the gear case for engagement between the teeth of the worm gear 12, whereby said gear will be prevented from rotation, as will be readily understood. Brackets 19, connected to the steering column and to the tube 15, suspend said tube in proper parallel relation to the steering column, and therebeneath, as clearly seen in the drawing. The upper end of the rod extends through the opening in the dashboard and is provided with a knob for manual operation thereof, as shown at 20. In the lower side of the rod there are formed the two notches 21 and 22, which are adapted for successive reception of the bolt 23 of a lock 24, mounted on the front face of the dashboard, and adjacent the upper end of the tube. The said upper end of the tube is formed with an opening 25 for the passage of the bolt to enter the notches of the rod. It will be seen from an inspection of the drawing that when the bolt is engaged in the lower notch 22 the rod is held in elevated position so that the steering column can be turned, but that when engaged in the upper notch 21, the rod is in lowered position with its tapered end engaged between the teeth of the worm gear. Thus the steering mechanism of the automobile is held from being operated, and the steering of the automobile impossible by a thief, because of the fact that the rod is held against upward movement so that the worm gear cannot be released. The key for operating the lock is passed through an opening in the dashboard opposite the lock casing.

There is thus provided a novel, simple and cheap device whereby an automobile can be placed in a condition safe against theft, the device being readily capable of attachment to any automobile now in use.

What is claimed is:

The combination with the steering column, worm gear, and worm gear casing of an automobile steering mechanism, the said casing having an opening therein, of a plurality of brackets detachably secured to and extending downwardly at an angle from the steering column, a tubular member carried by the lower ends of the brackets and disposed in parallel relation to the steering column, a rod slidable longitudinally in said tubular member and having a tooth on one end for passage through the opening of the gear casing and into engagement with the worm gear, the tubular member having an opening adjacent one end, a lock carried by the tubular member and including a sliding bolt arranged for passage through said opening of the tubular member, and the said slidable rod having a pair of notches for interchangeable disposition opposite the opening of the tubular member to receive the said lock bolt.

In testimony whereof I affix my signature, in the presence of two witnesses.

CHARLOTTE G. FETTE.

Witnesses:
OMER FORTIER,
JULIUS ALMANDINGER.